United States Patent [19]
Grizzle et al.

[11] Patent Number: 5,914,353
[45] Date of Patent: Jun. 22, 1999

[54] PROCESS OF RECYCLING WASTE POLYMERIC MATERIAL AND AN ARTICLE UTILIZING THE SAME

[75] Inventors: Mark L. Grizzle, Whitfield County; Lynn E. Preston, Bartow County; Stephen A. Zegler, Cohutta, all of Ga.; Paul L. Weinle, Concord, N.C.

[73] Assignee: Collins & Aikman Floorcoverings, Inc., Dalton, Ga.

[21] Appl. No.: 08/897,264

[22] Filed: Jul. 18, 1997

Related U.S. Application Data

[63] Continuation-in-part of application No. 08/664,954, Jun. 13, 1996, Pat. No. 5,728,741, which is a continuation of application No. 08/517,571, Aug. 21, 1995, abandoned.

[51] Int. Cl.⁶ .................................................. C08J 11/04
[52] U.S. Cl. .............................. 521/40; 264/37; 264/143; 264/211.23; 428/85; 521/40.5; 521/45.5
[58] Field of Search ....................... 521/40, 40.5, 45.5; 428/85; 264/143, 211.23, 37

[56] References Cited

U.S. PATENT DOCUMENTS

| | | | |
|---|---|---|---|
| 3,334,153 | 8/1967 | Fukushima et al. | 260/857 |
| 3,551,231 | 12/1970 | Smedberg | 428/97 |
| 3,560,284 | 2/1971 | Wisotzky et al. | 156/72 |
| 3,654,219 | 4/1972 | Boyer et al. | 260/41.5 |
| 3,658,752 | 4/1972 | Das et al. | 260/41.5 |
| 3,661,691 | 5/1972 | Slosberg . | |
| 3,695,987 | 10/1972 | Wisotzky et al. | 161/67 |
| 3,698,973 | 10/1972 | Wisotzky et al. | 156/78 |
| 3,728,182 | 4/1973 | Wisotzky et al. | 156/72 |
| 4,003,866 | 1/1977 | Paturle | 260/17.4 R |
| 4,028,159 | 6/1977 | Norris | 156/94 |
| 4,105,709 | 8/1978 | Iwami et al. | 260/2.857 |
| 4,158,646 | 6/1979 | Benkowski et al. | 260/2.3 |
| 4,250,222 | 2/1981 | Mavel et al. | 428/285 |
| 4,359,556 | 11/1982 | Lakshmanan et al. | 525/420.5 |
| 4,371,576 | 2/1983 | Machell | 428/92 |
| 4,437,918 | 3/1984 | Morohashi et al. | 156/322 |
| 4,808,459 | 2/1989 | Smith et al. | 156/72 |
| 4,870,110 | 9/1989 | Mehra et al. | 521/46.5 |
| 4,877,827 | 10/1989 | Van Der Groep | 524/477 |
| 4,968,463 | 11/1990 | Levasseur | 264/40.1 |
| 4,988,764 | 1/1991 | Nishio et al. | 525/66 |
| 5,010,138 | 4/1991 | Westeppe et al. | 525/183 |
| 5,112,908 | 5/1992 | Epstein | 525/66 |
| 5,122,404 | 6/1992 | Fowler | 428/87 |
| 5,122,569 | 6/1992 | Scheibelhoffer et al. | 525/66 |
| 5,217,655 | 6/1993 | Schmidt | 264/22 |
| 5,294,384 | 3/1994 | David et al. | 264/37 |

FOREIGN PATENT DOCUMENTS

| | | |
|---|---|---|
| 2080259 | 4/1993 | Canada . |
| 0511469 | 11/1992 | European Pat. Off. . |
| 24 25 751 | 12/1975 | Germany . |
| 40 14012A1 | 4/1990 | Germany . |
| 60-206868 | 10/1985 | Japan . |
| 3 239754 | 2/1990 | Japan . |
| 1058978 | 3/1982 | Russian Federation . |
| 2 049 540 | 12/1980 | United Kingdom . |
| 93/19654 | 10/1993 | WIPO . |

Primary Examiner—Terressa Mosley
Attorney, Agent, or Firm—J. Michael Martinez de Andino; McGuire, Woods, Battle & Boothe LLP

[57] ABSTRACT

The present invention provides for an improved process for recycling waste polymeric material comprising a mixture of waste polymeric material wherein the waste polymeric material includes from about 0 to 40 percent aliphatic polyamide material; granulating and densifying the chopped mixture into fragments at least about 100 times smaller than the size of the waste polymeric material; and extruding the ground mixture at a temperature that does not exceed the temperature at which the largest portion of polymer based material decomposes.

12 Claims, 3 Drawing Sheets

5,914,353

PROCESS OF RECYCLING WASTE POLYMERIC MATERIAL AND AN ARTICLE UTILIZING THE SAME

RELATED APPLICATIONS

This is a continuation-in-part of prior application Ser. No. 08/664,954 filed on Jun. 13, 1996, U.S. Pat. No. 5,728,741 which is a continuation of prior application Ser. No. 08/517, 571 filed Aug. 21, 1995, now abandoned, and is also related to application Ser. No. 08/826,431 filed on Mar. 18, 1997, U.S. Pat. No. 5,855,981 which is a continuation of prior application Ser. No. 08/517,230 filed on Aug. 21, 1995, now abandoned, all of which are continuations of prior application Ser. No. 08/193,801 filed Feb. 9, 1994, now abandoned, the disclosures of which are incorporated herein in their entirety.

BACKGROUND AND FIELD OF THE INVENTION

The present invention relates to recycling and reclaiming waste polymeric material, and forming an article therefrom, and more particularly forming a floor covering utilizing the recycled and reclaimed waste polymeric material.

There has been an increased interest in recycling, reclaiming and reutilizing waste and scrap material, and particularly waste thermoplastic polymeric material from a variety of sources. The recycling of most mixtures of thermoplastic scrap material is limited by the incompatibility of the various different kinds of thermoplastic material present in the scrap. For example, the various thermoplastic resins are often insoluble in each other resulting in a heterogeneous mixture in which each type of resin forms a dispersed phase in the other. This often adversely affects the mechanical properties (e.g. tensile and impact strength) and aesthetic properties of any articles formed from such a mixture.

One suggestion to overcome this problem is to sort the scrap material based on the specific thermoplastic material present. Such sorting, however, is often impractical from both a technical and economic standpoint. Thus, various other solutions have been proposed with respect to recycling waste polymeric material. For example, U.S. Pat. No. 4,250, 222 to Mavel et al. proposes coarsely grinding a mixture of two or more mutually incompatible thermoplastic resins, incorporating into the coarsely ground thermoplastic resin mixture, through the application of heat and pressure, from about 5 to about 25 parts of weight of a fibrous material, and forming the resin/fiber mass into an article.

U.S. Pat. No. 4,968,462 to Levasseur proposes shredding or granulating polymeric waste, drying the material to a water content of not more than 8% by weight, preheating the material to a temperature of 80° C. to 160° C., kneading at a temperature of 120° C. to 250° C. and injection molding or extruding the material to form a product such as a fence post.

Processes for recycling floor covering have also been desired inasmuch as a particularly large amount of scrap material is generated during the manufacture of floor covering. For example, in the manufacture of tufted carpet, the tufted carpet may have nylon pile secured in a primary backing of a woven polypropylene fabric which has a secondary vinyl plastic backing. The pile, the primary backing and secondary backing are typically each a thermoplastic having different characteristics.

Specific to recycling carpet, U.S. Pat. No. 4,028,159 to Norris proposes a process for reclaiming selvedge formed during manufacturing. The process comprises heating the selvedge in air to a temperature above the melting points of the resins to melt and degrade the resins; separating melted resin from solid residue to reclaim meltable resin from the selvedge; and utilizing the reclaimed resins as a substitute for at least a portion of the high molecular weight resins in an adhesive mixture in subsequent carpet production.

U.S. Pat. No. 4,158,645 to Benkowski et al. proposes applying a shearing force (e.g., using a Banbury mixer) to tear the fabric fibers into lengths no greater than about 0.25 inch. This forms a mixture of thermoplastic-resin and short lengths of fabric fibers. The resulting mixture is subjected to heat and pressure, such as by a drop mill and thus banded. After the mixture is banded, it can be calendared onto a web of fabric to form a finished reinforced sheet or extruded into various continuous forms such as sheets or strips. The process is described as being particularly useful as applied to scrap polyvinyl chloride sheet material reinforced with cotton fabric.

These processes of recycling or reclaiming scrap material, however, are not entirely successful and have not found widespread usage because of economic infeasibility and limitations on the types of article which can be made. Thus, it is among the objects of the invention to provide an improved process of recycling, reclaiming, and reutilizing scrap material, and particularly thermoplastic scrap material from the manufacture of floor covering or the subsequent removal of the floor covering after installation.

It is another object of the present invention to provide a new floor covering using the recycled and reclaimed scrap material.

SUMMARY OF THE INVENTION

These and other objects and advantages of the present invention are accomplished by a process for recycling waste polymeric material comprising a mixture of waste polymeric material wherein the waste polymeric material may include from about 0 to 40 percent aliphatic polyamide material; granulating the chopped mixture into fragments at least an order of magnitude smaller than the size of the waste polymeric material; densifying the granulated chopped mixture into fragments having a more uniform and solid consistency; and extruding the densified granulated mixture at a temperature of less than the temperature at which the vinyl monomer and copolymer components of the waste material decompose. The process of the present invention can be used to make various articles of manufacture.

A floor covering is also provided. The floor covering comprises a carpet having textile fibers defining a fibrous upper face and a primary backing to which the textile fibers are secured and a secondary backing permanently adhered to the lower surface of the primary backing, the secondary backing comprising a matrix formed by granulating a coarsely chopped mixture of waste polymer material including 0 to 40 percent aliphatic polyamide material, densifying the granulated chopped mixture into fragments having a more uniform and solid consistency, extruding the densified granulated mixture at a temperature of less than the temperature at which the largest portion of vinyl monomer and copolymer components of the waste material decompose and calendering the extruded granulated material to provide the secondary backing layer for a carpet.

BRIEF DESCRIPTION OF THE DRAWINGS

Some of the objects and advantages of the invention having been stated, other objects will appear as the description proceeds when taken in conjunction with the accompanying drawings in which.

DETAILED DESCRIPTION OF THE PREFERRED EMBODIMENT

While the present invention will be described more fully hereinafter with reference to the accompanying drawings in which particular embodiments of the invention are shown, it is to be understood at the outset that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
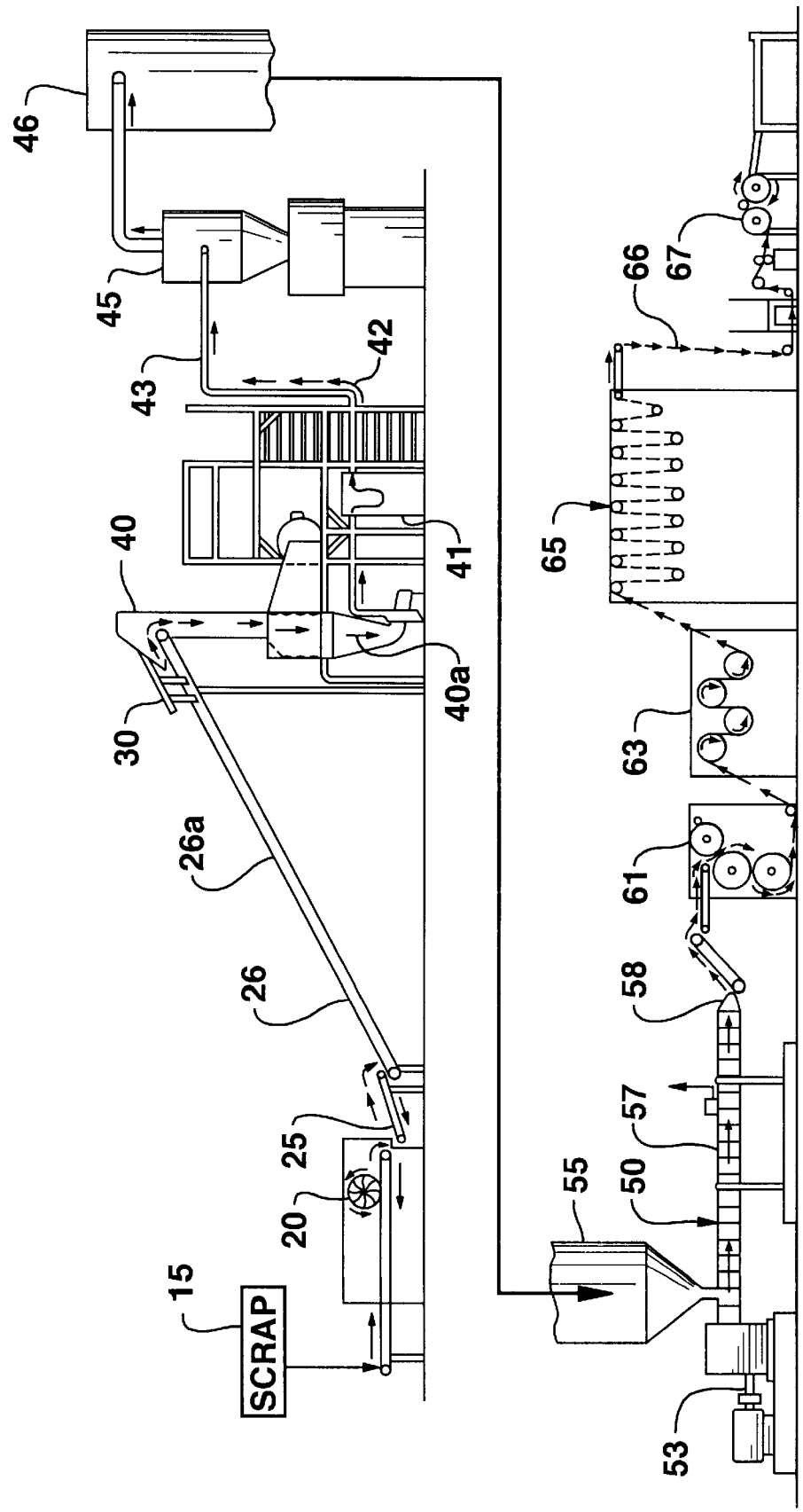
FIG. 1 is a diagrammatic view of the process in accordance with the present invention.
Figure 2:
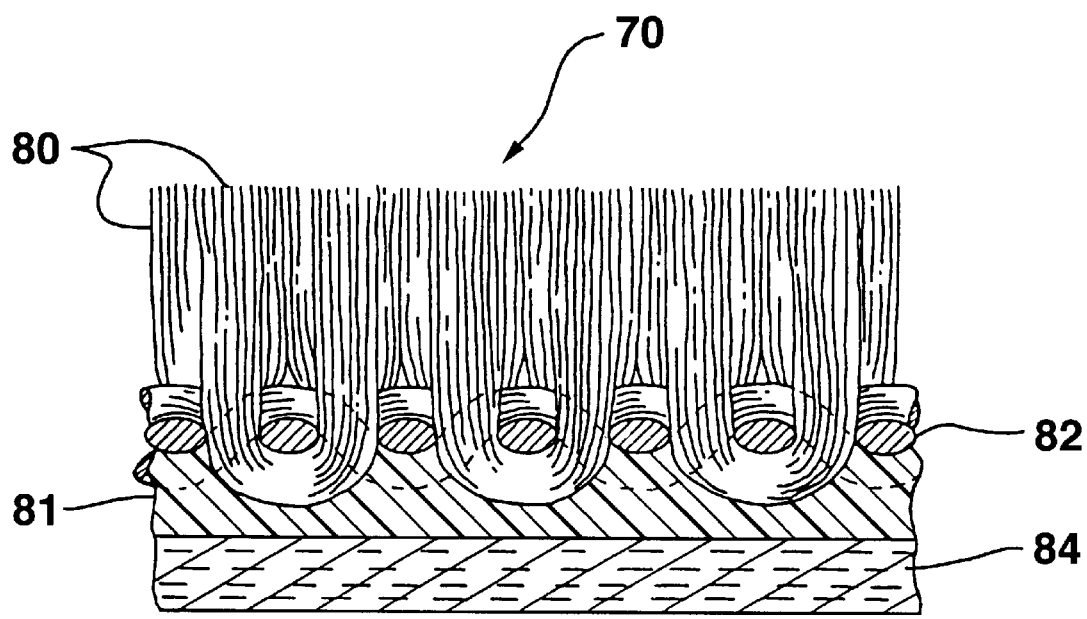
FIG. 2 is an enlarged cross-sectional view of a floor covering in accordance with the present invention.

A preferred form of the process is illustrated in FIG. 1 wherein waste polymeric material (scrap) 15, such as carpet remnants or carpet tiles, is delivered to a chopper 20. The waste polymeric material typically comprises a wide variety of thermoplastic material generated during the manufacture of floor coverings and generated in the disposal of used floor coverings. Typical thermoplastic materials that may be present include aliphatic polyamides, polyolefins (e.g., polyethylene and polypropylene), polymers based on vinyl monomers (e.g., vinyl chloride and vinyl esters such as vinyl acetate), polymers based on acrylic monomers (e.g., acrylic acid, methyl acrylic acid, esters of these acids, and acrylonitrile), and blends and copolymers thereof. The aliphatic polyamides that are present in the material 15 range in the amount of about 0 to 40 percent of the total amount of material 15. The aliphatic polyamides add stability to the resulting recycled material 66, such that the aliphatic polyamides increase the tear resistance and breaking strength and decrease the elongation and shrinkage of the resulting recycled material 66. The term "aliphatic polyamide polymer" used herein and throughout the specification may include, but is not limited to, long-chain polymeric or copolymeric amide which has recurring amide groups as an integral part of the main polymer or copolymer chain, which may be in the form of a fiber. Examples of aliphatic polyamides can include nylon 6 or poly (ω-caprolactam); nylon 66 or poly (hexamethylenediamineadipic acid) amide; poly (hexamethylenediamine-sebacic acid) amide or nylon 610; and the like. The mixture that is used to produce the resulting recycled layer 84 made from the resulting recycled material 66, as shown in FIG. 2, is designed to produce an article of manufacture 70 and 90 that have flexible properties such that the articles 70 and 90 can be rolled at room temperature and at colder temperatures.

The chopper 20 is any conventional chopper that coarsely chops the waste polymer material into ¾ to 1 inch in width portions. A suitable chopper is Model CT-60 available from Pieret, Inc. The chopped mixture 26a is transported, for example, via a conveyer belts 25 and 26 to a metal removal station 30, such as a magnet. Most foreign metal objects are detected and removed so as to avoid damaging the equipment. The chopped mixture 26a, free of most metal, is transported via conveyer belt 26 to a granulator into fragments at least an order of magnitude smaller than the original size of waste polymeric material. Typically this is about ⅜ inch and smaller. A suitable granulator is Model 24-1 available from Cumberland Company.

The granulated mixture 40a is transported to a densifier 41. The densifier 41 is designed to heat, melt, and form or compact solid smaller pieces of the granulated mixture 40a such that the extruder 50 can produce a more uniform blend of the resulting recycled material 66. The densifier 41 increases the density of the granulated mixture 40a to form densified material 42 that will be fed to the extruder 50. With the use of the densifier 41, such as a Plastcompactor Pelletizer Model No. CV50, manufactured by HERBOLD ZERKLEINERUNGSTECHNIK GmbH, the density of the granulated material 40a is increased such that the output of the extruder 50 is increased from approximately 1,000 lbs. per hour to approximately 4,000 to 6,000 lbs. per hour. The densifier 41 blends the granulated material 40a, which can be in the form of a fluffy, fibrous material with solid polymeric particles to form the densified material 42 which is in the shape of semi-uniform pellets. Alternatively or in combination with the densifier 41, the granulated mixture 40a can be sent via a conveyor 26 to a cryogenic grinder (not shown) that uses liquid nitrogen to freeze the chopped mixture 26a before the frozen material is ground by the granulator 40 to form a hard shaped cryoground material 42A that is fed into the extruder 50. The densified material 42 and/or the cryoground material 42A is transported via air in a conduit 43 to a Gaylord loading station 45 and/or to a silo 46. If desired, fines and dust can be removed and separated from the densified material 42 and/or the cryoground material 42A.

The densified material 42 and/or the cryoground material 42A is then conveyed to the extruder 50. A suitable extruder is Model 2DS-K 57M32 or ZSK-170 M 1750 10 G, both available from Werner & Pfleiderer. The extruder 50 includes a control means 53 (e.g., a motor gear box) and a feeder 55 that is connected to the silo 46 and to additional feeding tubes for accepting different materials. Control means 53 is provided to insure that the extruder 50 and feeder 55 act cooperatively to maintain a constant feed condition throughout the conveying zone to a zone comprising one or more kneading zones (not shown). The fed materials then pass through an extruder barrel 57 including a degassing zone and then through a pumping zone which forces the same through a die 58. The pumping zone functions to develop sufficient through-put without creating intolerable back pressures and torque in the preceding zones or on the thrust bearings of the extruder 50. The extruder is operated at a temperature selected to not exceed the temperature at which the largest portion of polymer based vinyl monomers and blends and copolymers thereof waste material decompose, which is about 200° C. (390° F. to 400° F.). Typically, the extruder 50 is operated such that a melt temperature of 360° F. to 380° F. is maintained as the extruded blend 59 exits the die 58. The extruded blend 59 can pass through a metal detector 60 before being transported to a calender 61, and then cooled at a cooling station 63. The cooled extruded blend 59 may be accumulated by an accumulator 65 with the resulting recycled material 66 then being rolled up at a collection station 67. The resulting recycled material 66 can be calendered to form a backing layer for a floor covering that is flexible and can be rolled or easily handled or moved.

Accordingly, exemplary articles of manufacture include secondary backings for floor coverings, components of other building material, such as sound barriers, roofing materials and the like. Further, the resulting recycled material 66 can be reduced in density by the addition of a chemical blowing agent, which when activated creates cavities of air. Density can also be reduced by other means. The reduction in density results in the resulting recycled material 66 to have cushioned properties which are known to improve the performance and handling of an article of manufacturing, such as a floor covering utilizing the reduced density resulting recycled material 66 as a secondary backing layer.

Referring to FIG. 2, a floor covering 70 (e.g. a pile carpet) utilizing the article of manufacture is illustrated. Tufted pile yarns 80 are looped through a primary backing 82, and extend upwardly therefrom. The backcoating 81 is an adhesive coating that fixes the pile yarns 80 in place in the primary backing 82. A secondary backing 84, which is made from the resulting recycled material 66, is then adhered to the primary backing 82 using the backcoating 81 or another adhesive. The primary backing 82 may be formed by weaving synthetic fibers, such as polypropylene, polyethylene, or polyester, for example, or may be a nonwoven construction of these fibers. As is conventional, the pile yarns 80 may be cut to form cut pile tufts as illustrated in FIG. 2, or may form loops as shown in FIG. 3.

The backcoating 81 may be comprised of any suitable polymer compound. Typically, the backcoating 81 is comprised of either a polymer emulsion polymerization product or a polymer plastisol compound. The backcoating 81 is cured on the textile material by heating or drying or in any way reacting the backcoating 81 to cure, cross link or fuse it to the textile material. An exemplary emulsion polymerization product includes a polyvinylidene chloride or ethylene vinyl copolymer with at least one acrylic monomer. Standard acrylic monomers include, for example, acrylic acid, methyl acrylic acid, esters of these acids, or acrylonitrile. Alternatively, the backcoating 81 may comprise conventional thermoplastic polymers which are applied to the carpet by hot melt coating techniques known in the art.

To bond the secondary backing 84 to the backcoating 81, additional heat is applied to both the secondary backing 84 and the backcoating 81 before pressing the two layers together. The secondary backing 84 is contacted with the backcoating 81. The temperature is sufficient to partially melt the contacting surface of the secondary backing 84 thereby bonding the secondary backing 84 to the backcoating 81 forming an integral structure, such as described in U.S. Pat. Nos. 3,560,284 and 3,695,987 to Wisotzky, the disclosures of which are incorporated herein by reference in their entirety.

Figure 3:
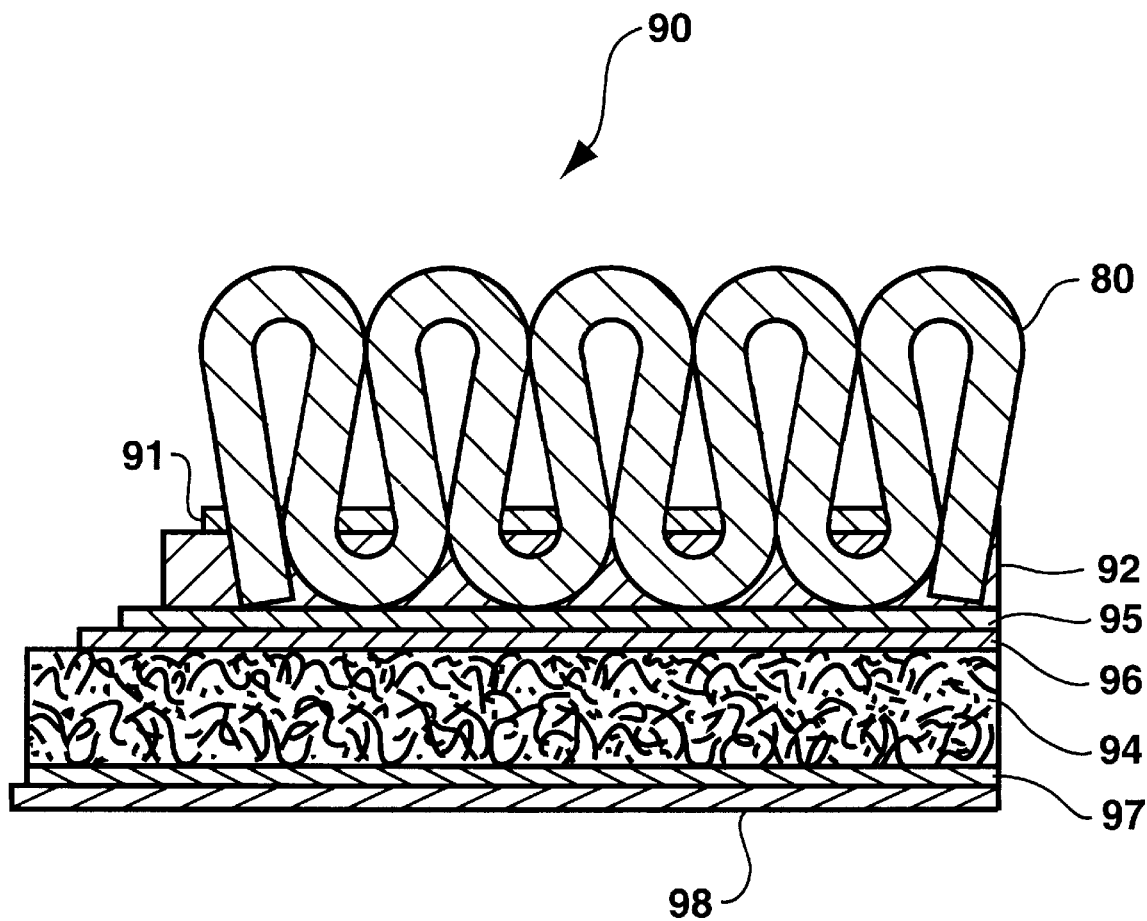
FIG. 3 is an enlarged cross-sectional view of an alternate embodiment of a floor covering in accordance with the present invention.

A second embodiment of a floor covering utilizing the resulting recycled material 66 is shown in FIG. 3. A floor covering 90, which may be formed in the shape of a tile, is shown having looped pile yarns 80 looped through a primary backing 91 and extending upwardly therefrom. A backcoating 92, which is an adhesive coating, is used to fix the pile yarns 80 in place in the primary backing 91. A stabilizing reinforcement layer 95 and a fusion coat or plastisol adhesive layer 96 are located between the primary backing 91 and a secondary backing 94. The secondary backing 94 can be made from the resulting recycled material 66. The fusion coat or plastisol adhesive layer 96 and the secondary backing 94 are heated before being pressed together to form the floor covering 90. Adhered onto the bottom surface of the secondary backing 94 is an aqueous, pressure sensitive oleophobic adhesive layer 97, as set forth in U.S. Pat. No. 4,849,267 for a Foam Backed Carpet with Adhesive Surface and Method of Installing Same, the disclosure of which is incorporated herein by reference in its entirety. A releasable cover 98 is removably attached to the oleophobic adhesive layer 97. The oleophobic adhesive layer 97 is used to encapsulate any fiberglass on the surface of the secondary backing 94.

The oleophobic adhesive layer 97 also accelerates equilibrium of moisture regain in the hydrophilic components of the secondary material 94. The extrusion process and/or the heating process results in a near bone dry condition of the hydrophilic components. The oleophobic adhesive layer 97 reintroduces moisture into the resulting recycled material 66, which is now the secondary backing 94. The forced drying of the oleophobic adhesive layer 97 once applied to the secondary backing 94 additionally improves the resulting stability of the floor coverings 70 and 90. The floor coverings 70 and 90 can be formed in the shape of a tile.

A third embodiment (not shown) of a floor covering utilizing the resulting recycled material 66 would be similar to that shown in FIG. 3, except that the layer 96 could be made directly from the resulting recycled material 66. This makes layer 96 now become the secondary backing layer and eliminates the need to have the backing layer 94. As previously discussed, the oleophobic adhesive layer 97, which would be placed against the layer 96, accelerates the equilibrium of moisture gain in the hydrophilic components of the resulting recycled material 66, which now is the layer 96.

Additionally, some carpet remnants, especially carpet tiles contain fiberglass reinforcement material. In recycling the carpet remnants and/or carpet tiles as scraps 15, the fiberglass, through the above-mentioned chopping and grinding process, is reduced to small pieces. The round, short, cylindrical pieces of fiberglass may plate out onto the surface allowing the possibility for release when handling the resulting recycled material 66. The oleophobic adhesive layer 97 encapsulates these fibers.

SUMMARY

The above-described process and the article utilizing the same provides for a process for recycling waste polymeric material that can include from 0 to 40% aliphatic polyamide material and vinyl monomer and copolymer components, granulating and densifying the chopped mixture into pelletized fragments for extruding the densified ground mixture at a melt temperature range of approximately 360° to 380° F. Articles, such as floor coverings, can be made utilizing the recycled article of manufacture.

It is to be understood that while certain forms of this invention have been illustrated and described, the invention is not limited thereto, except insofar as such limitations are included in the following claims.

That which is claimed is:

1. A process for recycling waste polymeric material, said process comprising:
   a. coarsely chopping a mixture of waste polymeric material wherein the waste polymeric material includes from about 0 to 40 percent aliphatic polyamide material;
   b. granulating the chopped mixture into fragments at least an order of magnitude smaller than the original size of the waste polymeric material;
   c. densifying the granulated mixture into a pelletized material;
   d. extruding the pelletized material at a temperature that does not exceed the temperature at which the major portion of the polymer waste material decomposes; and
   e. positioning the extruded granulated material to overlie and adhere to a backcoating of the carpet.

2. The process to claim 1, wherein the temperature of extrusion is less than about 400° F.

3. The process of claim 1, wherein an oleophobic adhesive layer is positioned to overlie and adhere to the secondary backing layer, and a releasable cover is removably attached to the oleophobic adhesive layer.

4. The process of claim 1, wherein the densifying of the granulated materials increases the extruding of the pelletized material over non-densified granulated materials by approximately 400 percent.

5. The process of claim 1, wherein the process includes the step of forming a carpet tile.

6. The process of claim 1, wherein the extruded granulated material is flexible and easy to handle.

7. A process for recycling waste polymeric material, the process comprising the steps of:
  a. chopping a mixture of waste polymeric material wherein the waste polymeric material has about 0 to 40 percent aliphatic polyamide material;
  b. granulating the chopped mixture into fragments that are smaller than the original size of the waste polymeric material;
  c. densifying the granulated mixture into pelletized material;
  d. extruding the pelletized material at a temperature at less than 400° F.;
  e. calendering the extruded granulated material to provide for a secondary backing layer for a carpet; and
  f. positioning the secondary backing layer to overlie and adhere to a backcoating of a carpet.

8. The process of claim 7, wherein an oleophobic adhesive layer is positioned to overlie and adhere to the backing layer, and a releasable cover is removably attached to the oleophobic adhesive layer.

9. The process of claim 7, wherein the process includes the step of forming a carpet tile.

10. The process of claim 7, wherein the secondary backing layer is flexible, can be rolled and is easy to handle.

11. A process for recycling waste polymeric material, the process comprising the steps of:
  a. chopping a mixture of waste polymeric material wherein the waste polymeric material has about 0 to 40 percent aliphatic polyamide material;
  b. granulating the chopped mixture into fragments that are smaller than the original size of the waste polymeric material;
  c. densifying the granulated mixture into pelletized material;
  d. extruding the pelletized material at a temperature at less than 400° F.; and
  e. forming and molding the extruding material to provide an article of manufacture.

12. A process for recycling waste polymeric material and for forming an article utilizing the resulting recycled material, the process comprising the steps of:
  a. chopping a mixture of waste polymeric material wherein the waste polymeric material has about 0 to 40 percent aliphatic polyamide material;
  b. granulating the chopped mixture into fragments that are smaller than the original size of the waste polymeric material;
  c. densifying the granulated mixture into a pelletized material;
  d. extruding the pelletized material at a temperature at less than 400° F.;
  e. calendering the extruded granulated material to provide a secondary backing layer for a carpet;
  f. adhering the secondary backing to a carpet;
  g. adhering an oleophobic adhesive layer with a releasable cover to the secondary backing layer; and
  h. forming a carpet tile.

* * * * *